United States Patent [19] [11] 3,774,125

Condon et al. [45] Nov. 20, 1973

[54] BAND REJECTION FILTER USING TANDEM COMMUTATING CAPACITOR UNITS

[75] Inventors: Joseph Henry Condon, Summit; William Kaminski, West Portal, both of N.J.

[73] Assignee: Bell Telephone Laboratories Incorporated, Murray Hill, N.J.

[22] Filed: Nov. 22, 1972

[21] Appl. No.: 308,740

[52] U.S. Cl. .................. 333/70 A, 328/167, 333/76
[51] Int. Cl. .............................................. H03h 7/10
[58] Field of Search .................. 333/70 R, 70 A, 75, 333/76; 328/167, 165

[56] References Cited

UNITED STATES PATENTS 3,375,451 3/1958 Borelli et al. ........................ 328/167

*Primary Examiner*—Rudolph V. Rolinec
*Assistant Examiner*—Marvin Nussbaum
*Attorney*—W. L. Keefauver et al.

[57] ABSTRACT

Signal attenuation by commutating capacitor units combined in tandem band rejection filter sections is enhanced by driving the units in different phases for commutating capacitor connections in the respective units.

7 Claims, 5 Drawing Figures

BAND REJECTION FILTER USING TANDEM COMMUTATING CAPACITOR UNITS

BACKGROUND OF THE INVENTION

1. Field of the Invention

This invention relates to band rejection filters employing commutating capacitor units, and it relates in particular to such filters utilizing plural filter sections.

2. Description of the Prior Art

It is well known in the art that parallel-connected, inductor-capacitor (LC), impedance combinations can be employed in tandem, band rejection, filter sections to provide increased attenuation of a frequency component to which all of such combinations are tuned. A copending J. H. Condon U.S. Pat. application Ser. No. 254,384, filed May 18, 1972 now U.S. Pat. No. 3,729,695, entitled "Commutating Capacitor Impedance Device," and which is assigned to the same assignee as the present application, teaches a commutating capacitor unit which is useful as a single-section band rejection filter to reject a principal input signal frequency component at a frequency which is equal to the frequency of commutation of capacitor connections in such unit. Such a filter is sometimes called a dynamic filter because capacitor connections must be continually switching while the device is being utilized for filtering.

It has been found, however, that if at least two such commutating capacitor unit, band rejection, filter sections are connected in tandem, and if the units are driven for commutation in phase with one another, they produce an output which is essentially the same at the principal frequency as that provided by a single such section rather than providing the expected increase in attenuation normally produced by cascading identical LC band rejection filter sections. In addition, it is known that commutating capacitor units produce harmonic effects at certain odd harmonics of the commutation frequency.

SUMMARY OF THE INVENTION

The foregoing problems of combining commutating capacitor units in tandem band rejection filter sections and of harmonic effects are reduced in severity in accordance with the present invention by driving the various units of the different filter sections in different phases for commutation of capacitor connections in those units.

It is a feature of one embodiment of the invention that the units of such sections are driven 30° out of phase with respect to one another to achieve increased attenuation at the principal frequency component as compared to the attenuation that would be realized from a single band rejection filter section.

It is another feature that the addition of a feed forward resistor to provide a phase-reversed bypass signal path around at least one section of the filter produces substantial cancellation of remanent fundamental frequency energy at the output of the last of the bypassed sections.

A further feature of the invention is that plural commutating capacitor units are combined in parallel in each section of the filter, and the different drive phases of all of such units of the filter are substantially uniformly spaced in a phase sequence by an amount that is dependent upon the number of units employed.

BRIEF DESCRIPTION OF THE DRAWING

A more complete understanding of the invention and the various features, objects and advantages thereof may be obtained from a consideration of the following detailed description in connection with the appended claims and the attached drawings in which:

DETAILED DESCRIPTION

Figure 1A:
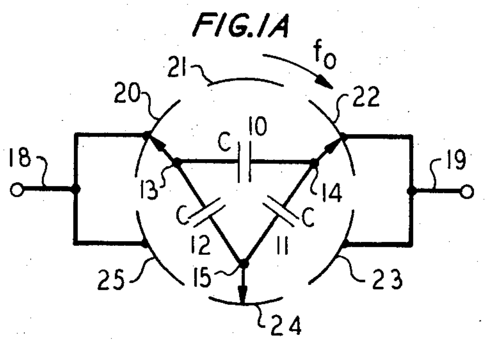
FIGS. 1A and 1B include a simplified schematic diagram of a commutating capacitor unit and a schematic representation of such unit, respectively.

In FIG. 1A there is presented in simplified form one embodiment of a commutating capacitor unit of the type described in the aforementioned Condon application. Briefly, three capacitors 10, 11, and 12 are connected in a delta circuit configuration having apex terminals 13, 14, and 15, which are connected in different pair combinations between an input connection 18 and an output connection 19 of the unit. The different combinations of connections are achieved by a commutating switching arrangement which, in effect, rotates the delta circuit clockwise at a frequency of $f_0$ hertz so that the apex terminals of the delta circuit are alternately brought into contact with different sets of three contacts of a commutating switch which includes contacts 20, 21, 22, 23, 24, and 25. In actual practice the commutating switching is advantageously accomplished by electronic switching arrangements, two of which are disclosed in the aforementioned Condon application. Both such arrangements are advantageously driven at a frequency of $6f_0$ hertz to produce the desired effective capacitor connection rotation at $f_0$ hertz.

All of the three capacitors of the delta circuit advantageously have approximately the same capacitance C. Signal conditions observed across the device of FIG. 1A, when an electrical signal is applied across the connections 18 and 19, resemble the response of a parallel inductance-capacitance circuit. In particular, maximum response is realized for a principal input signal frequency which is equal to the commutation frequency $f_0$.

Figure 1B:
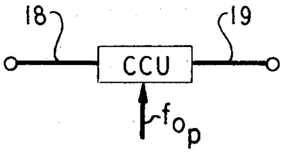

FIG. 1B is a schematic representation of the two-terminal impedance device illustrated in FIG. 1A. This representation is normally considered to include the means, of whatever form, utilized for achieving the commutation switching. However, circuits are separately shown herein for producing drive signals for actuating the switching means. Those signals are applied as schematically represented by an arrow $f_{0p}$ in FIG. 1B, where $p$ indicates the phase of the drive as will be subsequently further described.

Figure 2:
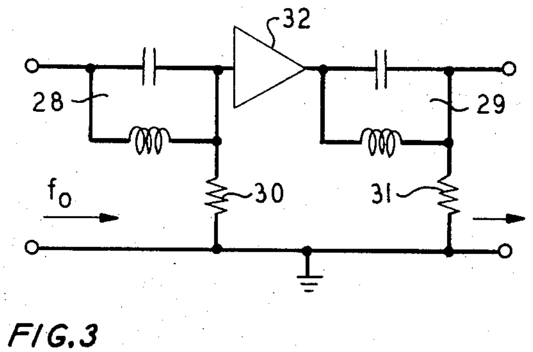
FIG. 2 PRIOR ART
FIG. 2 is a schematic diagram of a prior art, multisection, LC, band rejection filter.

FIG. 2 depicts a prior art, two-section, unbalanced, band rejection filter. Each section includes in series in one side of the signal path a different one of two parallel LC circuits 28 and 29. Each section also includes a terminating resistor, such as one of the resistors 30 and 31, connected in shunt across the output of the section. The circuits 28 and 29 are tuned for parallel resonance at a frequency component $f_0$ of the filter input signal.

A buffer amplifier 32 is connected in series in the signal path between the filter sections and thus between the parallel resonant circuits 28 and 29. Amplifier 32 can have any convenient gain since it is included in the circuit primarily to prevent loading of the first section of the filter by the second section thereof. This two-section prior art filter produces approximately twice the attenuation of the frequency $f_0$ that would be produced by a single section.

Figure 3:
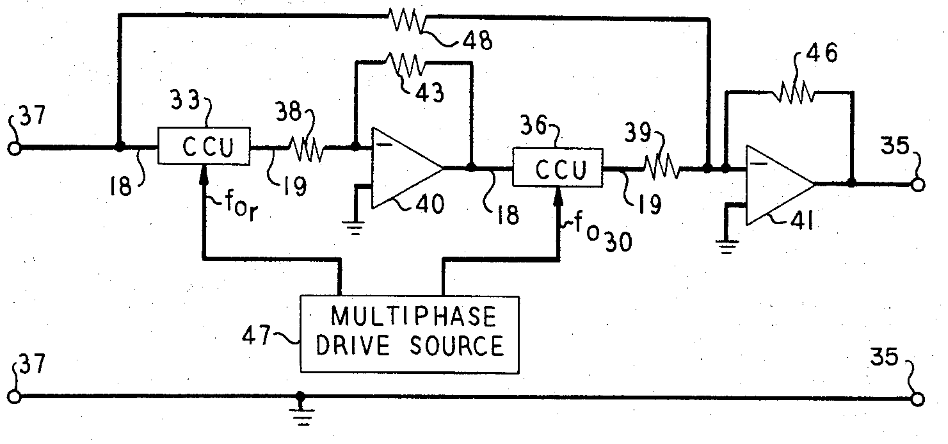
FIG. 3 is a schematic diagram of a multisection band rejection filter employing commutating capacitor units in accordance with the present invention.

In FIG. 3 there is presented a two-section, unbalanced, band rejection filter utilizing commutating capacitor units in accordance with the present invention. Each section includes a different one of two commutating capacitor units 33 and 36 connected in series with one another in one side of the signal path between the filter input terminals 37 and output terminals 35. Those units are coupled by series current limiting resistors 38 and 39, respectively, to inverting input connections of two operational amplifiers 40 and 41, respectively. Noninverting input connections of those amplifiers are connected to ground as is the return current circuit 42 extending between input and output connections of the filter. Two additional resistors 43 and 46 are connected to provide feedback from the outputs of amplifiers 40 and 41, respectively, to the inverting input connections of the respective amplifiers.

Resistors 38 and 43 have resistance values which are selected to provide a resistance ratio $-R_{43}/R_{38}$ which determines the gain of the input section of the filter of FIG. 3 at frequencies on either side of the band rejection filter attenuation response notch. Resistors 46 and 39 in the second section of the filter serve a similar purpose for that section, and in many applications will in fact have the same resistances as resistors 43 and 38, respectively. The resistance of resistor 38 and the sum of the capacitances of capacitors 10, 11, and 12 in the unit 33 fix a time constant which determines the width of the filter response notch for the first section of the filter in FIG. 3. A similar relationship prevails with respect to resistor 39 and the capacitors of unit 36 in the second section.

The particular configuration of resistors and amplifiers employed in the embodiment of FIG. 3 was chosen primarily for convenience of laboratory analysis. It also provides a handy way to obtain a phase reversal for a purpose to be described. In practice the filter configuration of FIG. 2, but using commutating capacitor units driven in different phases, can be employed equally well.

The commutating capacitor units 33 and 36 are advantageously of the same form and include capacitors of the same capacitance. This form is advantageously that which is illustrated schematically in FIG. 1A herein. These units 33 and 36 are driven for commutating the capacitor connections in the units at the common frequency $f_0$. The $6f_0$ hertz electronic signal drives for this purpose are provided in different phases from a multiphase drive signal source 47. Thus, the unit 33 is driven in a reference phase as schematically represented by the character $f_{or}$ adjacent to drive circuit coupling from source 47. Unit 36 is driven in a different phase, which is advantageously 30 electrical degrees, as indicated by the character $f_{o30}$, different from the phase of the signal $f_{or}$. Phase differences indicated herein are measured on a signal at the frequency $f_0$. It is immaterial whether the $f_{o30}$ signal leads or lags the reference signal.

As indicated in the aforementioned J. H. Condon application, the $f_0$ capacitor connection commutation rate is actually produced by providing a signal at the frequency $6f_0$ hertz for operating the electronic switching apparatus included in the commutating capacitor unit. The $6f_0$ drives are advantageously obtained in the source 47 by providing an oscillator (not shown) which produces an output signal of $6nf_0$ hertz which is utilized to drive a divide-by-n circuit (not shown). Since $n$ is the number of commutating capacitor units, i.e., two in FIG. 3, the divider is advantageously a bistable circuit; and the binary ONE and ZERO outputs of the bistable circuit provide the commutating drives for the units 33 and 36, respectively, in phases 30° apart.

As already described herein, cascaded commutating capacitor units which are driven in phase with one another produce the same $f_0$ output signal response as a single commutating capacitor unit. A single such unit connected in a band rejection filter arrangement produces an attenuation of the $f_0$ signal component by 20.4 dB regardless of the capacitance employed in the unit and the absolute value of $f_0$. However, when the two cascaded units 33 and 36 of FIG. 3 are driven in different phases, they produce about 29.4 dB of attenuation of the $f_0$ component of the filter input signal. It is believed that this type of operation by tandem commutating capacitor units is due to the fact that the output of a first commutating capacitor unit filter section is an alternating current wave with a zero average value in each of successive time slots. A second commutating capacitor unit filter section supplied with signal from the first section and commutating in phase with the first section sees only an input signal with a zero average value and produces a like output signal. However, when the unit of the second section is driven for commutation in a different phase, its corresponding time slots of operation are shifted so that they encompass parts of different time slot signals from the first section and which usually no longer have a zero average value. Accordingly, the second section has a significant signal upon which to work; and it produces a corresponding additional 9 dB of attenuation.

The overall attenuation effect of the band rejection filter in FIG. 3 is significantly improved, beyond the aforementioned 29.4 dB attenuation, by providing a feed forward resistor 48 which is coupled from the input connection 18 of unit 33 to the inverting input connection of amplifier 41. This resistor connects points of opposite phase in the signal path of the overall filter; and, thus, it illustratively bypasses two commutating capacitor units 33 and 36, which do not invert the signal, and the intervening signal inverting amplifier 40. Resistor 48 is assigned a resistance value which produces upon signals coupled therethrough an attenuation which is substantially the same as the attenuation to which the $f_0$ signal is subjected in transmission through unit 33, resistor 38, amplifier 40, unit 36, and resistor 39. Thus, the portion of the $f_0$ signal component which is coupled through resistor 48 cancels the remanent portion of the $f_0$ signal after transmission through the commutating capacitor units.

Figure 4:
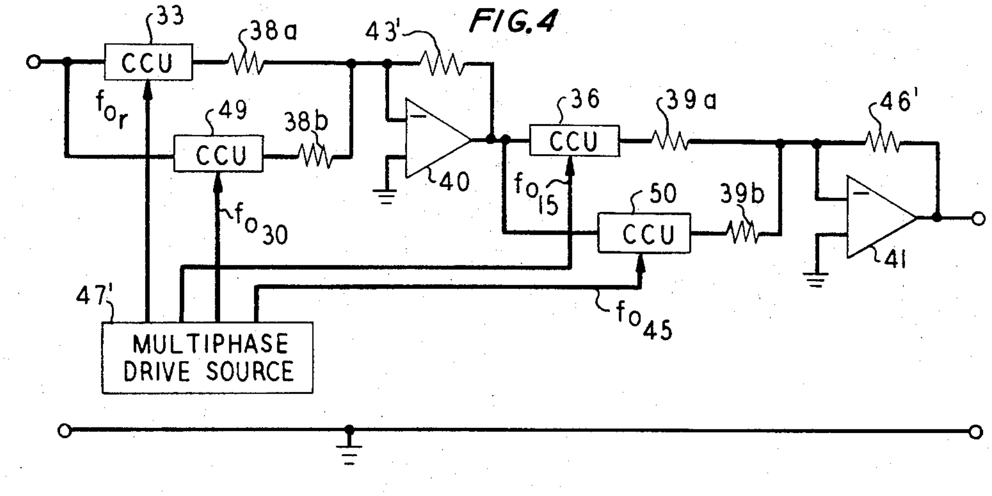
FIG. 4 is a schematic diagram of a modification of the filter of FIG. 3.

FIG. 4 illustrates a modification of the band rejection filter embodiment of FIG. 3. Circuit elements in FIG. 4 which are the same as, or similar to, those in FIG. 3 are indicated by the same or similar reference characters. A commutating capacitor unit operating in a band rejection filter produces frequency aliasing of frequencies near $f_0$, i.e., within the $f_0$ frequency notch. Such aliasing and other harmonic effects are discussed in a copending patent application of L. G. Bahler and J. H. Condon, Ser. No. 274,488, filed July 24, 1972, entitled "Band-Rejection Filter Using Parallel-Connected Commutating Capacitor Units" and assigned to the same assignee as the present application. This aliasing produces output signals near the fifth, seventh, 11th, 13th, etc. harmonics of $f_0$. The same is true of the FIG. 3 embodiment. A band rejection filter also has attenuation characteristics at the same harmonics of $f_0$. If an input signal can include those harmonics, the output is unpredictable. In line with the discussion in the Bahler et al. application, parallel commu-tating capacitor units are employed in FIG. 4 to eliminate some of the aliased signals and the harmonic frequency notches at the same harmonics. Thus, in FIG. 4 additional commutating capacitor units 49 and 50 are added, along with their respective current limiting resistors 38*b* and 39*b*, in branch signal paths which are connected in parallel with the branch signal paths of units 33 and 36 and their resistors 38*a* and 39*a*, respectively. The added commutating capacitor units are identical to those employed in the embodiment of FIG. 3, and all units of FIG. 4 are driven for commutation of their capacitor connections by drive signals provided from a multiphase drive source 47'. Resistors 38*b* and 39*b* and the resistors 38*a* and 39*a* are of the same resistance magnitude as the resistors 38 and 39, respectively of FIG. 3. Consequently, the feedback resistors 43' and 46' in FIG. 4 have half the resistance of their counterparts in FIG. 3 if the embodiment of FIG. 4 is to have a response which evidences the same gain at frequencies away from the principle attenuation notch as is produced by the embodiment of FIG. 3.

In FIG. 4, all of the commutating capacitor units are driven in different phases for commutation of their respective capacitance connections. In the first section of the filter, including units 33 and 49, the drive phase difference is determined as indicated in the aforementioned Bahler et al. application. Thus, the phase difference for that section is 60°/N where N is the number of commutating capacitor units in the parallel connection. Since N is equal to two for the first section, the phase difference between the drives is 30° as measured on a signal wave of frequency $f_0$ hertz. In any other section of the filter of FIG. 4, the drive phase differences for the units of that section are determined in the same fashion. However, the drive phases for such additional section are shifted with respect to the phases of the first section so as to be distributed evenly, i.e., interleaved in a phase sequence, with respect to the latter phases. Thus, in the second section, including units 36 and 50 of the embodiment of FIG. 4, the drive phases $f_{o15}$ and $f_{o45}$ are employed for the units 36 and 50. These drive phases are 30° apart and they are evenly spaced by 15° with respect to the $f_o$ and $f_{o30}$ drive phases for the first section.

Polyphase drives are produced by the source 47', and all are at the frequency $6f_0$ hertz. This is achieved by any logic arrangement which is convenient to the purpose. For example, the source 47' advantageously includes an oscillator (not shown) operating at a frequency of $6nf_0$ hertz, $24f_0$ hertz for the FIG. 4 filter that has a total of four commutating capacitor units. The oscillator output drives a divide-by-n circuit (not shown) which produces the $6f_0$ signal at the reference phase. The latter signal is also utilized to drive an ($n$-1)-stage shift register (not shown) that receives shift clock signal directly from the oscillator. The outputs of the respective shift register stages then provide the additional $6f_0$ waves at the different phases. For the embodiment of FIG. 4, where $n$=4, the three-stage shift register produces $6f_0$ waves at phases of 15°, 30°, and 45° with respect to the reference wave $6f_{or}$ for application to the units 36, 49, and 50, respectively. The reference wave is applied to unit 33. All of the aforementioned logic in the source 47' is of the positive, or leading edge, triggered variety for producing the outputs described. A multiphase source of the type outlined is shown in the aforementioned Bahler et al. application.

It has been discovered that the filter of FIG. 4 has an additional feature beyond the suppression of certain harmonic effects. It increases the $f_0$ signal attenuation to more than twice the attenuation effected by a single filter section. Thus, the embodiment of FIG. 4 attenuates the $f_0$ signal by about 54 dB, an increase of about 34 dB as compared to a single section and an increase of about 24 dB as compared to the embodiment of FIG. 3 without resistor 48. That attenuation is further increased by employing the feed forward resistor technique described in connection with FIG. 3. The form using two units in parallel in each section, as shown in FIG. 4, suppresses harmonic effects near the fifth, seventh, 17th, 19th, etc. harmonics.

Although the present invention has been described in connection with particular embodiments thereof, it is to be understood that additional embodiments, applications, and modifications which will be apparent to those skilled in the art are included within the spirit and scope of the invention.

What is claimed is:

1. In combination, signal input and output connections, first and second commutating capacitor units each having a signal input and a signal output, means for connecting said units in series for coupling signals between said input and output connections, means for driving said units in different phases with respect to one another for recurrently commutating capacitor connections in said units through a predetermined sequence of connections and, said driving means includes means for driving said units in different phases 30° apart as measured on an input connection signal frequency component of frequency equal to the recurrence frequency of commutation of said capacitor connections.

2. In combination, signal input and output connections, a plurality of commutating capacitor units each having a signal input and a signal output, means for connecting at least two of said units in series for coupling signals between said input and output connections, plural phase inverting means, means for connecting each of said phase inverting means in series in the output of a different one of said commutating capacitor units, and means for driving said units in different phases with respect to one another for recurrently commutating capacitor connections in said units through a predetermined sequence of connections.

3. The combination in accordance with claim 2 in which said commutating capacitor units and said connecting means therefor comprise a band rejection filter with an attenuation response notch at a frequency $f_0$ corresponding to the recurrence frequency of commutation of said capacitor connectors, and each of said units includes a first resistor connected between an output of such commutating capacitor unit and an inverting input connection of said inverting means in the output of such unit and a second resistor connected in a feedback path around the last-mentioned inverting means, sad first and second resistors being proportioned to produce for such unit and its associated phase inverting means a predetermined level of signal gain in the portions of said filter response other than said notch.

4. The combination in accordance with claim 3 in which said phase inverting means each comprises an operational amplifier with true and said inverting input connections and an output connection, means for connecting an output of the corresponding one of said units to said inverting input connection, and means for connecting said true input connection to a common ground reference for said band rejection filter.

5. The combination in accordance with claim 4 in which means are provided for coupling signals forward from said signal input connection to said inverting input connection of one of said operational amplifiers in opposite phase with respect to signals otherwise coupled to the same amplifier from its corresponding commutating capacitor unit, and the last-mentioned coupling means comprises means for attenuating signals from said signal input connection by an amplitude amount which is approximately the same as the attenuation of signals at said frequency $f_0$ in transmission through any of said commutating capacitor units to the same amplifier input connection.

6. In combination, signal input and output connections, a plurality of commutating capacitor units each having a signal input and a signal output, means for connecting at least two of said units in series for coupling signals between said input and output connections, means for driving said units in different phases with respect to one another for recurrently commutating capacitor connections in said units through a predetermined sequence of connections, and means for feeding forward from said input connection to an output of one of said units an amplitude-reduced part of a signal at said input connection, the forward fed signal being in phase opposition with respect to signals otherwise transmitted through any of said units to said one unit output, said amplitude-reduced part having a principal frequency component amplitude which is approximately equal in magnitude to the principal frequency component magnitude of said otherwise transmitted signals.

7. In combination, signal input and output connections, a plurality of commutating capacitor units each having a signal input and a signal output, means for connecting at least two of said units in series for coupling signals between said input and output connections, and means for driving said units in different phases with respect to one another for recurrently commutating capacitor connections in said units through a predetermined sequence of connections, said series-connected commutating capacitor units comprise a multisection band rejection filter including one of said units per section and in which each of said series-connected units has at least another one of said commutating capacitor units connected in a parallel branch signal path therewith, said driving means comprises, in a first one of said sections, means for driving the parallel-connected units thereof in different phases 60°/N apart, where N is the number of parallel-connected commutating capacitor units in said first section, and said driving means further includes, in each other section of said filter, means for driving the parallel-connected units thereof in different phases 60°/N apart but wherein the latter different phases are evenly interleaved with the different phases of said first section so that no two units of said band rejection filter are driven in the same phase.

* * * * *

UNITED STATES PATENT OFFICE
CERTIFICATE OF CORRECTION

Patent No. 3,774,125 Dated Nov. 20, 1973

Inventor(s) Joseph H. Condon and William Kaminski

It is certified that error appears in the above-identified patent and that said Letters Patent are hereby corrected as shown below:

Column 3, line 61, "$f_{0r}$" should read --$f_{0_r}$--; line 64, "$f_{030}$" should read --$f_{0_{30}}$--; line 65, "$f_{0r}$" should read --$f_{0_r}$--; line 67, "$f_{030}$" should read --$f_{0_{30}}$--. Column 5, line 54, "$f_{015}$" should read --$f_{0_{15}}$--; line 55, "$f_{045}$" should read --$f_{0_{45}}$--; line 57, "$f_{030}$" should read --$f_{0_{30}}$--. Column 6, line 8, "$6f_{0r}$" should read --$6f_{0_r}$--. Column 7, line 12, "sad" should read --said--.

Signed and sealed this 9th day of April 1974.

(SEAL)
Attest:

EDWARD M.FLETCHER,JR.
Attesting Officer

C. MARSHALL DANN
Commissioner of Patents